United States Patent
Denli et al.

(10) Patent No.: US 10,996,372 B2
(45) Date of Patent: May 4, 2021

(54) GEOPHYSICAL INVERSION WITH CONVOLUTIONAL NEURAL NETWORKS

(71) Applicants: Huseyin Denli, Basking Ridge, NJ (US); Niranjan A. Subrahmanya, Mountain View, CA (US)

(72) Inventors: Huseyin Denli, Basking Ridge, NJ (US); Niranjan A. Subrahmanya, Mountain View, CA (US)

(73) Assignee: ExxonMobil Upstream Research Company, Spring, TX (US)

( * ) Notice: Subject to any disclaimer, the term of this patent is extended or adjusted under 35 U.S.C. 154(b) by 298 days.

(21) Appl. No.: 16/057,356

(22) Filed: Aug. 7, 2018

(65) Prior Publication Data

US 2019/0064389 A1  Feb. 28, 2019

Related U.S. Application Data

(60) Provisional application No. 62/550,072, filed on Aug. 25, 2017.

(51) Int. Cl.
| | |
|---|---|
| *G01V 99/00* | (2009.01) |
| *G06N 3/08* | (2006.01) |
| *G06N 3/04* | (2006.01) |
| *G01V 7/06* | (2006.01) |
| *G01V 1/30* | (2006.01) |
| *G01V 1/28* | (2006.01) |
| *G01V 3/38* | (2006.01) |
| *G01V 11/00* | (2006.01) |

(52) U.S. Cl.
CPC ............. *G01V 99/005* (2013.01); *G06N 3/04* (2013.01); *G06N 3/0454* (2013.01); *G06N 3/08* (2013.01); *G01V 1/282* (2013.01); *G01V 1/306* (2013.01); *G01V 3/38* (2013.01); *G01V 7/06* (2013.01); *G01V 11/00* (2013.01)

(58) Field of Classification Search
CPC ...... G01V 99/005; G01V 1/282; G01V 1/306; G01V 3/38; G01V 7/06; G01V 11/00; G06N 3/04; G06N 3/0454; G06N 3/08
See application file for complete search history.

(56) References Cited

U.S. PATENT DOCUMENTS

| | | | |
|---|---|---|---|
| 10,310,113 B2* | 6/2019 | Sun ...................... | G01V 1/362 |
| 10,489,687 B2* | 11/2019 | Tsai ...................... | G06N 3/08 |
| 2010/0088035 A1* | 4/2010 | Etgen .................... | G01V 1/30 |
| | | | 702/16 |

(Continued)

OTHER PUBLICATIONS

Akcelik, V. et al. (2011) "Multiparameter material model and source signature full waveform inversion," *SEG Technical Program Expanded Abstracts*, pp. 2406-2410.

(Continued)

*Primary Examiner* — Raymond L Nimox
(74) *Attorney, Agent, or Firm* — ExxonMobil Upstream Research Company Law Department

(57) ABSTRACT

A method including: storing, in a computer memory, geophysical data obtained from a survey of a subsurface region; and extracting, with a computer, a subsurface physical property model by processing the geophysical data with one or more convolutional neural networks, which are trained to relate the geophysical data to at least one subsurface physical property consistent with geological prior information.

20 Claims, 12 Drawing Sheets

(56) References Cited

U.S. PATENT DOCUMENTS

| | | | | |
|---|---|---|---|---|
| 2010/0212909 | A1* | 8/2010 | Baumstein | G01V 1/28 166/369 |
| 2015/0362623 | A1* | 12/2015 | Miotti | G01V 11/00 702/14 |
| 2017/0168177 | A1* | 6/2017 | Wang | G01V 1/36 |
| 2017/0270624 | A1* | 9/2017 | Rooney | G06Q 30/018 |
| 2019/0169962 | A1* | 6/2019 | Aqrawi | E21B 41/00 |
| 2019/0391295 | A1* | 12/2019 | Salman | G01V 99/005 |
| 2020/0160173 | A1* | 5/2020 | Pandey | G01V 99/005 |

OTHER PUBLICATIONS

Aster, R. C. et al. (2013) "Parameter Estimation and Inverse Problems," Elsevier 2$^{nd}$ Edition, Chapter 4, pp. 93-115.

Baan, M. et al. (2000) "Neural networks in geophysical applications," *Geophysics*, v. 65(4), pp. 1032-1047.

Backus, G. E. et al. (1967) "Numerical applications of a formalism for geophysical inverse problems," vol. 13, *Geophysical Journal of the Royal Astronomical Society*, v. 13, pp. 247-276.

Chave A. D. et al. (2012) "The magnetotelluric method: theory and practice," *Cambridge University Press*, pp. 1-7.

Denli, H. et al. (2013) "Full-wavefield inversion for acoustic wave velocity and attenuation," *SEG Technical Program Expanded Abstracts*, pp. 980-985.

Duchi, J. et al. (2011) "Adaptive subgradient methods for online learning and stochastic optimization," *Journal of Machine Learning Research*, v. 12, pp. 2121-2159.

Etgen, J. T. et al. (2010) "Introduction to this special section: Reverse time migration," *The Leading Edge*, v. 29(11), pp. 1363-1363.

Goodfellow, I. J. et al. (2014) "Generative Adversarial Networks," *Machine Learning, arXiv*, pp. 1-9.

He, K. et al. (2016) "Deep residual learning for image recognition," *2016 IEEE Conference on Computer Vision and Pattern Recognition*, pp. 770-778.

Hesthaven, J. S. et al. (2008) "Nodal Discontinuous Galerkin Methods: Algorithms, Analysis, and Applications," *Springer, Texts in Applied Mathematics*, pp. 19-39.

Janoos, F. et al. (2014) "Multi-scale graphical models for spatio-temporal processes," *Advances in Neural Information Processing Systems*, v. 27, pp. 316-324.

Kingma, P. D. et al. (2015) "Adam: A Method for Stochastic Optimization," *ICLR, arXiv*, pp. 1-15.

Komatitsch, D. et al. (2000) "The spectral element method for three-dimensional seismic wave propagation," *SEG Technical Program Expanded Abstracts*, pp. 1-4.

Leveque, R. J. (2002) "Finite volume methods for hyperbolic problems," *Cambridge Texts in Applied Mathematics, Cambridge University Press*, pp. 64-86.

Li, Y. et al. (2015) "Gravity and magnetic methods in mineral and oil & gas exploration and production," *EAGE*, pp. 15-24.

Macias, C. C. et al. (2000) "Artificial neural networks for parameter estimation in geophysics," *Geophysical Prospecting*, v. 48, pp. 21-47.

Moczo, P. et al. (2007) "The finite-difference time-domain method for modeling of seismic wave propagation," *Advances in Wave Propagation in Heterogeneous Earth, Advances in Geophysics*, pp. 421-516.

Nocedal, J. et al. (2006) "Numerical optimization," *Springer Series in Operations Research and Financial. Engineering, Springer*, pp. 21-26.

Oldenburg, D., (1990)"Inversion of electromagnetic data: An overview of new techniques," *Surveys in Geophysics*, v. 11(2), pp. 231-270.

Poulton, M. M. (2001) "Computational neural networks for geophysical data processing," *Handbook of Geophysical Exploration*, Chapters 7-8, pp. 101-124.

Ronneberger, O. et al. (2015) "U-Net: Convolutional Networks for Biomedical Image Segmentation," *Medical Image Computing and Computer-Assisted Intervention (MICCAI), Springer, LNCS*, v. 9351, pp. 234-241.

Roth, G. et al. (1994) "Neural networks and inversion of seismic data," *Journal of Geophysical Research*, v. 99, pp. 6753-6768.

Sava, P. et al. (2009) "Overview and classification of wavefield seismic imaging methods," *The Leading Edge*, v. 28(2), pp. 170-183.

Schiesser, W. E. (1991) "What is the Numerical Method of Lines," *Academic Press*, pp. 1-31.

Srivastava, N. et al. (2014) "Dropout: A simple way to prevent neural networks from overfilling," *Journal of Machine Learning Research*, v.15, pp. 1929-1958.

Tarantola, A. (2005) "Inverse problem theory and methods for model parameter estimation," *SIAM*, Chapter 3, pp. 57-64.

Virieux, J. et al. (2009) "An overview of full-waveform inversion in exploration geophysics," *Geophysics*, v. 74(6), pp. WCC127-WCC152.

Yilmaz, O. (2001) "Seismic data analysis: Processing, inversion, and interpretation of seismic data," *Investigations in Geophysics, Society of Exploration Geophysicists*, Chapter 4, pp. 463-476.

* cited by examiner

GEOPHYSICAL INVERSION WITH CONVOLUTIONAL NEURAL NETWORKS

CROSS REFERENCE TO RELATED APPLICATIONS

This application claims the priority benefit of U.S. Patent Application No. 62/550,072 filed Aug. 25, 2017 entitled GEOPHYSICAL INVERSION WITH CONVOLUTIONAL NEURAL NETWORKS, the entirety of which is incorporated by reference herein.

TECHNOLOGICAL FIELD

Exemplary embodiments described herein pertain to geophysical prospecting. More specifically, exemplary embodiments described herein pertain to a method based on artificial neural networks for automatically determining subsurface physical properties using geological prior information and measurements acquired at locations remote from the subsurface region of interest.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Hydrocarbons (e.g., oil and natural gas) are typically found thousands of meters below Earth's surface. In order to locate these resources, the oil and gas industry relies on geophysical prospecting. An important step of geophysical prospecting is to accurately image subsurface structures such as sedimentary layers, anomalies and faults using geophysical data. Seismic prospecting, for example, images subsurface structures and infers their geophysical properties through measurement of seismic waves originated from man-made sources at the Earth's surface. Seismic waves originated from the sources propagates into Earth's interior and reflects and refracts at the structural interfaces formed by geologic processes such as sedimentation, faulting and fracturing, and travels back to the surface where receivers such as geophones or hydrophones are located. The seismic data received by the geophones is processed in an effort to create an accurate mapping of the subsurface environment. The processed data is then examined with a goal of identifying geological formations that may contain hydrocarbons.

Extracting subsurface physical properties from geophysical data, typically known as geophysical inversion, involves determining distributed values of at least one physical parameter of a subsurface region (e.g., compressional wave speed, shear wave speed, density, electrical conductivity, permeability, or porosity) in a manner which is consistent with at least one geophysical data set acquired at locations remote from the subsurface region of interest [1]. In today's oil & gas industry, the geophysical inversion plays a vital role to build models of subsurface physical properties and generate high-resolution images of the subsurface. A geophysical inverse problem can be mathematically described through the minimization of an objective function which often includes a least-squares data misfit and a regularization term [7]. Such an objective function typically takes the form $$c(\kappa) = \int_M \|u(\kappa) - \bar{u}\|^2 dx + R(\kappa), \quad (1)$$

where $\kappa$ represents the physical unknowns to be determined through optimization, $\bar{u}$ is the measured data, $u(\kappa)$ is synthetic data computed during the optimization according to a mathematical model (e.g., an array of numbers, typically a 3-D array, where each number, which may be called a model parameter, is a value of velocity, density, or another physical property in a cell, where a subsurface region has been conceptually divided into discrete cells for computational purposes), M denotes the locations at which the data is measured, $\|\cdot\|$ is an arbitrary norm used to quantify the error or misfit between the computed data $u(\kappa)$ and the measured data $\bar{u}$, and $R(\kappa)$ is a regularization term (e.g. Tikhonov regularization) often used to mathematically stabilize the inversion [2].

Although the true physical parameter $\kappa$ is a spatially varying function defined at every point of a subsurface domain $\Omega$, $\kappa$ is typically discretized, for computational purposes, when optimizing the objective function $c(\kappa)$. Such a discretization typically amounts to first partitioning the subsurface domain $\Omega$ into disjoint cells $\Omega_i$, such that $\Omega = \cup \Omega_i$, and then setting $\kappa(x) = \kappa_i$ for $x \in \Omega_i$. One example of such a partitioning into cells 103 is a regular Cartesian grid as shown in FIG. 1, along with sources 101 and receivers 102. The parameter values $\{\kappa_i\}$ are determined by optimizing Equation (1), typically using a gradient-based optimization technique such as Gauss-Newton, quasi-Newton, or steepest descent [11].

A number of inverse problems arise in the context of geophysics [5] including full-wavefield inversion [8], electromagnetic inversion [9], magnetic inversion [6], gravity and gradiometry inversion [10] problems. The state-of-the-art methods solving these inverse problems face a number of challenges including computational challenges, lack of convexity in functional defined in Equation (1) and the inherent non-uniqueness. In order to provide more quantitative details about these challenges, the following will describe a conventional full-wavefield inversion (FWI) problem as the representative inverse problem. However, challenges in solving these inverse problems with the state-of-the-art methods are common across these inverse problems, any discussion pertaining to FWI is merely an example and in no way limiting the scope of the present technological advancement.

FWI is a process of extracting subsurface information from the seismic data measured at the surface of the earth acquired during a seismic survey. In a typical seismic survey, seismic waves are generated by a source positioned at desired locations as shown in FIG. 1. As the source generated wave propagates through the subsurface and travels back to the receiver locations where it is recorded. FWI exploits these full seismic record including events that are treated as "noise" by standard seismic processing algorithms.

The main components of an FWI algorithm can be described as follows: using a starting subsurface physical properties model, synthetic seismic data are generated by solving a wave equation using a numerical scheme (e.g., finite-difference, finite-element etc.). The synthetic seismic data are compared with the field seismic data and using the difference between the two, the value of an objective function is calculated. To minimize the objective function, the subsurface model is modified along a descent direction (also called search direction) and the modified subsurface model is used to simulate a new set of synthetic seismic data. This new set of synthetic seismic data is compared with the field data to recalculate the new value of the objective function. The objective function optimization procedure is iterated by using the new updated model as the starting model for finding a new descent direction, which will then be used to modify the model in order to better explain the field data. The process continues until an updated model is found that satisfactorily explains the observed data. A global or local optimization method can be used to minimize the objective function and to update the subsurface model. Commonly used local objective function optimization methods include, but are not limited to, gradient search, conjugate gradients, quasi-Newton, Gauss-Newton and Newton's method. Commonly used global methods included, but are not limited to simulated annealing, Markov-Chain-Monte Carlo or grid search methods.

FWI is carried out through an iterative minimization of an objective function consisting of a norm data misfit and a regularization term as similar to (1):

$$\mathcal{F}(\kappa) = \frac{1}{2} \sum_{s}^{N_s} \sum_{r}^{N_r} \int_{t_0}^{t_f} \|u(\kappa; x_s, x_r, t) - \overline{u}(x_s, x_r, t)\|^2 dt + R(\kappa). \quad (2)$$

Here, $\kappa(x)$ represents the unknown physical properties distributed across the subsurface to be determined through minimization of equation (2); these properties can include compressional wave speed, shear wave speed, anisotropy and attenuation parameters, and the source temporal signature in some cases [3, 4]. In addition, x is the spatial coordinate system, $N_s$ and $N_r$ are the number of sources and receivers respectively, t is time, $t_0$ is the time at which the source s is fired and the recording is started and $t_f$ is the final recording time, $\overline{u}(x_s, x_r, t)$ is the measurement at the receiver location $x_r$ due to source s located at $x_s$ at time t, $u(\kappa; x_s, x_r, t)$ is the data at the receiver location $x_r$ due to source s located at $x_s$ at time t computed according to a mathematical model, $R(\kappa)$ is a regularization term used to mitigate the mathematical ill-posedness of the inverse problem (e.g. Tikhonov or total-variation regularization).

The mathematical model, also known as a forward problem, used to compute $u(\kappa; x_s, x_r, t)$ describes the physics of seismic waves propagating in the subsurface. Depending on the assumptions made about the subsurface medium, the governing equations for simulating seismic waves can be acoustic, elastic or acoustic-coupled-elastic wave equations. In some cases, additional aspects of wave propagation in the subsurface, namely anisotropy and attenuation, must be taken into account in order to fully explain the seismic measurements. Anisotropy is due to either the presence of materials or features in the subsurface below seismic wavelengths such as fine rock layers and fractures, whose response is equivalent to that of a homogeneous anisotropic medium. Seismic attenuation accounts for the loss of energy in the wavefield due to conversion into other forms such as heat and fluid motion. While this discussion will focus on acoustic waves, this in no limiting the scope of the present technological advancement. Adopting that u describes the acoustic pressure of a bounded medium where the acoustic waves travel through, we have that u satisfies $$\frac{1}{\kappa} \frac{\partial^2 u}{\partial t^2} = \nabla \cdot \left( \frac{1}{\rho} \nabla u \right) - \frac{f}{\rho} \delta(x - x_s), \quad (3)$$

$$u = \frac{\partial u}{\partial t} = 0 \text{ at } t = 0,$$

-continued $$u = 0 \text{ on } \Gamma_{free} \times [0, t_f],$$

$$\sqrt{\frac{\rho}{\kappa}} \frac{\partial u}{\partial t} + n \cdot \nabla u = 0 \text{ on } \Gamma_{absorbing} \times [0, t_f].$$

Here $\nabla$ is the spatial gradient operator, $\rho$ is the mass density and $\kappa$ is the bulk modulus which is a function of compressional wave speed $v_p$ and density $\rho$ as $\kappa = \rho v_p^2$. A homogeneous mass density is assumed of $\rho = 1$ g/cm$^3$. In addition, $\Gamma_{free}$ and $\Gamma_{absorbing}$ are the free and absorbing boundaries, and n is the normal unit vector to $\Gamma_{absorbing}$. Typically. $\Gamma_{free}$ represents the Earth's surface (i.e. the air-water interface in marine environments or the air-solid interface on land environments) due to the approximately stress-free state at the interface. The remaining boundaries of the computational domain typically belong to $\Gamma_{absorbing}$; the boundary condition is designed to prevent spurious reflected waves due to truncation of the physical domain. Finally, it is assumed that the source is fired at location $x_s$, $f(t)\delta(x-x_s)$, and is a spherically symmetric pressure source with a source temporal signature $f(t)$ (such as Ricker wavelet).

A variety of numerical techniques exist for solving the acoustic wave Equation (3). Typically, this can be discretized using the method of lines [12]. First, Equation (3) is discretized in space using finite difference [15], finite volumes [16] or finite elements (e.g. spectral elements [13] and the discontinuous-Galerkin method [14]). The resulting system of ordinary differential equations (ODEs) is then integrated using an appropriate time stepping scheme (e.g. forward Euler, Runge-Kutta).

The forward problems in geophysical applications, such as the acoustic wave Equation (3), are mathematically well-posed problems and numerical solutions to these forward problems exist. However, solving the inverse problems such as (2) subject to (3) face significant challenges. These include computational challenges, the lack of convexity in the objective function (1) and (2) and the non-uniqueness of solutions.

Even with today's available high-performance computing resources, one of the biggest challenges to geophysical inversions is still the computational cost. For instance, FWI applications often contain billions of unknowns and hundreds of thousands of sources and receivers. Solving such inverse problems is extremely intensive in terms of both computational memory and number of floating-point operations. Providing real-time solutions with the state-of-the-art methods are far-off intractable. Development of new algorithms and workflows that lead to faster turnaround time is a key step towards making this technology feasible for field-scale applications, allowing users to solve larger scale problems faster, or real-time (wherein real-time refers to an amount of time which is short enough that data processing can keep up with data acquisition).

The large scale nature of the geophysical inverse problems dictates that local-gradient-based techniques can be used to solve (2) and precludes the use of global optimization techniques. However, it has been observed that the functional (2) is not convex due to the oscillatory nature of the measured signal. Applying gradient-based optimization methods to the non-convex functional (2) leads to results that are sensitive to the initial guess for the starting subsurface physical property model. Proving a good initial guess for the starting model to an inverse problem remains to be a critical task to obtain reliable results.

Non-uniqueness is a pervasive feature of geophysical inverse problems. Geophysical surveys typically acquire data at locations remote from the subsurface region of interest and at narrow frequency bands due the physical limitations. In the context of FWI, the sources and receivers are placed on the Earth's surface (or at or near the ocean's surface for marine surveys) and the data typically contains frequencies from 3 Hz to 60 Hz with a good signal-to-noise ratio. These limitations lead to incomplete information and large uncertainty about the subsurface region of interest. Mitigating the uncertainty in inverse problems require additional data. One potential source of such data is geologic priors (existing geological information that was available before the solution was formed and which was incorporated into the solution). Other sources include well logs and joint inversion of different geophysical data sets. However, the current state-of-the-art methods don't offer a framework of incorporating the geologic priors or solving joint inversions of multiple geophysical datasets in a structurally consistent manner.

SUMMARY

A method including: storing, in a computer memory, geophysical data obtained from a survey of a subsurface region, and extracting, with a computer, a subsurface physical property model by processing the geophysical data with one or more convolutional neural networks, which are trained to relate the geophysical data to at least one subsurface physical property consistent with geological prior information.

In the method, the geophysical data can include one or more of seismic, time-lapse seismic, magnetic, electrical, electromagnetic, gravity, gradiometry, well log, well pressure, or well production data.

In the method, the subsurface physical property can include one or more of acoustic, elastic, anisotropy, attenuation, electrical, magnetic, or flow properties.

The method can further include training the convolutional neural network with synthetically generated subsurface physical models consistent with the geological prior information and computer simulated data generated from the synthetically generated subsurface physical models.

The method can further include generating the computer simulated data based on an acoustic wave equation, an elastic wave equation, coupled acoustic-elastic wave equations, Maxwell's equations, or potential-field equations, and the appropriate boundary conditions.

The method can further include training the convolutional neural network with a training set of measured geophysical data and subsurface models associated with the training set of measured geophysical data.

The method can further include training the convolutional neural network with a blend of synthetic geophysical data and a training set of measured geophysical data and their associated subsurface models.

The method can further include training the convolutional neural network with geophysical training data that represents prior geological knowledge about the subsurface region, the geophysical training data including environment of deposition, well information, stratigraphy, subsurface structural patterns and geophysical property ranges.

In the method, the convolutional neural network can be a convolutional neural network including one or more operations of convolution, filtering, downsampling, upsampling, upconvolution, thresholding, or non-linear activation.

In the method, the convolutional neural network can be built with a J-net architecture.

In the method, the convolutional neural network can be built with a ResNet architecture.

The method can further include training the convolutional neural network with a gradient descent algorithm or a stochastic gradient descent algorithm.

The method can further include monitoring a geophysical survey that is obtaining the geophysical data based on the subsurface physical property model.

The method can further include modifying a design of a geophysical survey that is obtaining the geophysical data during the geophysical survey based on the subsurface physical property model.

The method can further include inputting the subsurface physical property model into subsurface interpretation, hydrocarbon exploration or hydrocarbon production process.

The method can further include inputting the subsurface physical property model into a geophysical imaging process.

The method can further include inputting the subsurface physical property model as a starting model of a geophysical inversion process.

The method can further include identifying reservoirs and hydrocarbon deposits based on the subsurface physical property model.

The method can further include constructing a reservoir model based on the subsurface physical property model.

A system, including: a ship including sources and receivers that acquire geophysical data of a subsurface region; and a non-transitory computer readable storage medium, encoded with instructions, which when executed by the computer causes the computer to store, in a memory of the computer, the geophysical data obtained from a survey of the subsurface region; and extract, with the computer, a subsurface physical property model by processing the geophysical data with one or more convolutional neural networks, which are trained to relate the geophysical data to at least one subsurface physical property consistent with geological prior information.

A non-transitory computer readable storage medium encoded with instructions, which when executed by the computer causes the computer to implement a method including: storing, in a computer memory, geophysical data obtained from a survey of a subsurface region; and extracting, with a computer, a subsurface physical property model by processing the geophysical data with one or more convolutional neural networks, which are trained to relate the geophysical data to at least one subsurface physical property consistent with geological prior information.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION

Exemplary embodiments are described herein. However, to the extent that the following description is specific to a particular embodiment, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

To overcome the limitations of the state-of-the-art methods for solving geophysical inverse problems, outlined in the previous section, the present technological advancement provides an approach based on training a deep convolutional neural network to learn a map from a set of geophysical data to a set of subsurface models. The map, here, refers to a graph that relates a set of inputs describing geophysical data to a set of variables describing subsurface models.

Artificial neural networks (ANN) are a class of machine learning algorithms built on the premise that they can be used to replicate any arbitrary continuous functional relationships. They are interconnected groups of artificial neurons or nodes. Each node typically implements a simple mathematical function such as a weighted summation of inputs and nonlinear mapping of the resulting sums. The connections among nodes are associated with weight parameters which can be modified to explain the reference data. These parameters of the network are determined through a training process which solves an optimization problem by minimizing the cost function between training references and neural network predictions.

ANNs have been applied to a number of geophysical data processing problems including geophysical inverse problems [24, 25, 26]. ANNs used for geophysical inverse applications have been based on general-purpose multi-layer perceptron architectures which are not designed for exploiting the multiscale complex structures present in the geophysical data and subsurface spaces [27]. These general-purpose ANNs require large amount of data to train, and cannot scale to the real-world size geophysical problems because the number of their internal parameters to be learned exponentially increases with the size of the input and output (input and output of the real-world geophysical inverse problems are typically described by billions of parameters). These shortcomings have limited ANN applications to the geophysical inverse problems, only allowing them to be applied for 1-D problems with significantly reduced-order data and model parameters [27].

Figure 2:
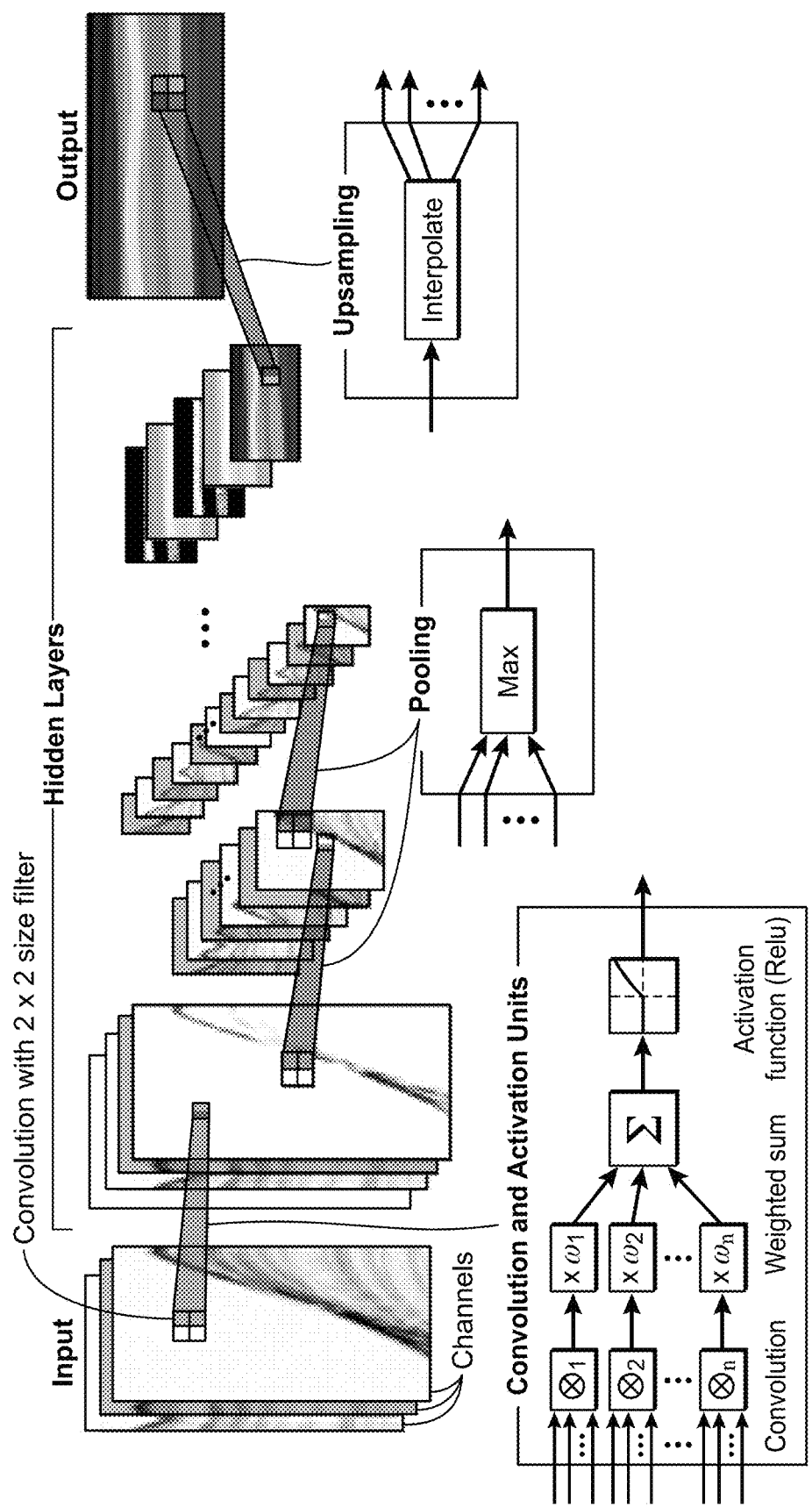
FIG. 2 illustrates basic operational units of a convolutional neural network.

For solving geophysical inverse problems, to the present technological advancement can use deep convolutional neural networks (CNN) which are comprised of a number of convolutional layers. These layers are input layers interfacing to the geophysical data, output layers interfacing to the subsurface models and hidden layers which are the remaining layers between input and output layers (FIG. 2). Each convolutional layer has a number of filters applied on a receptive field which is one of the outputs of the adjoining layer. These filters can be learned to extract various features of a receptive field. Convolutional layers are much more efficient when compared to standard multi-layer neural networks (e.g. multi-layer perceptrons) for spatial and temporal data processing problems due to weight sharing which greatly reduces the free parameters being learned (wherein weight sharing means that the same filter weights are used for each location of a receptive field; this reduces memory footprint and improves performance). Another benefit of such a network is that they can efficiently exploit the structural information (e.g. spatial or temporal correlations) in the input, output and the hidden layers.

CNNs are typically built by stacking a number of basic functional units such as convolution, weighted-summation, activation, downsampling (also called pooling) and upsampling units as illustrated in FIG. 2. The convolution unit applies a discrete convolution operator on the receptive field and filter, and passes the results to the next operational unit. The filter coefficients used in the convolution operation are learned during the training process. These filters can extract various features of the receptive fields such as edges or shapes, or simply translate, deform and rotate the receptive field. The weighted-summation units add the input values after weighting them. If the weight values are ones for all the input values, then it becomes a summation operation. The activation unit is based on a function defining the output value given an input or set of inputs. The activation function may be as simple as an "ON" or "OFF" switch depending on a threshold value. The activation functions are typically nonlinear functions such as rectified-linear unit (ReLU), softsign, hyperbolic tangent (tan h) and Gaussian functions. The downsampling unit combines values of the non-overlapping regions into one value, reducing the dimensionality of the receptive field. One way of downsampling is to apply a maximum filter on the non-overlapping subregions of the receptive field. The upsampling unit increases the number of samples of the receptive field by typically interpolating the values of the receptive field.

The input to the CNN is typically an n-dimensional array. For instance, the input space of a 3D subsurface seismic data may be discretized as a 5-dimensional array of $nt \times nr_x \times nr_y \times ns_x \times ns_y$, where nt is the number of samples in time, $nr_x$ and $nr_y$ are the number of receivers along x and y axes of the surface, and $ns_x$ and $ns_y$ are the number of sources along x and y axes of the surface. For a CNN processing, such an input array may require layers with 5-dimensional convolutional filters. Alternatively to reduce the complexity of the convolution filters, one can assume that source dimensions are not correlated with the receiver dimensions leading to $ns_x \times ns_y$ channels of $nt \times nr_x \times nr_y$ dimensional input data. In this case, a CNN can be built with only layers of 3-dimensional convolutions at the cost of losing the capability of representing the higher-dimensional spatio-temporal relationships. The output could also be an n-dimensional array quantity. For instance, the physical properties of a 3D subsurface model may be presented with a 3 dimensional array of $mz \times mx \times my$ with mp channels, where mx, my and mz are the number of spatial samples in depth z, lateral directions x and y, and mp is the number of physical parameters such as compressional wave speed, shear wave speed, attenuation and anisotropy parameters.

Figure 3:
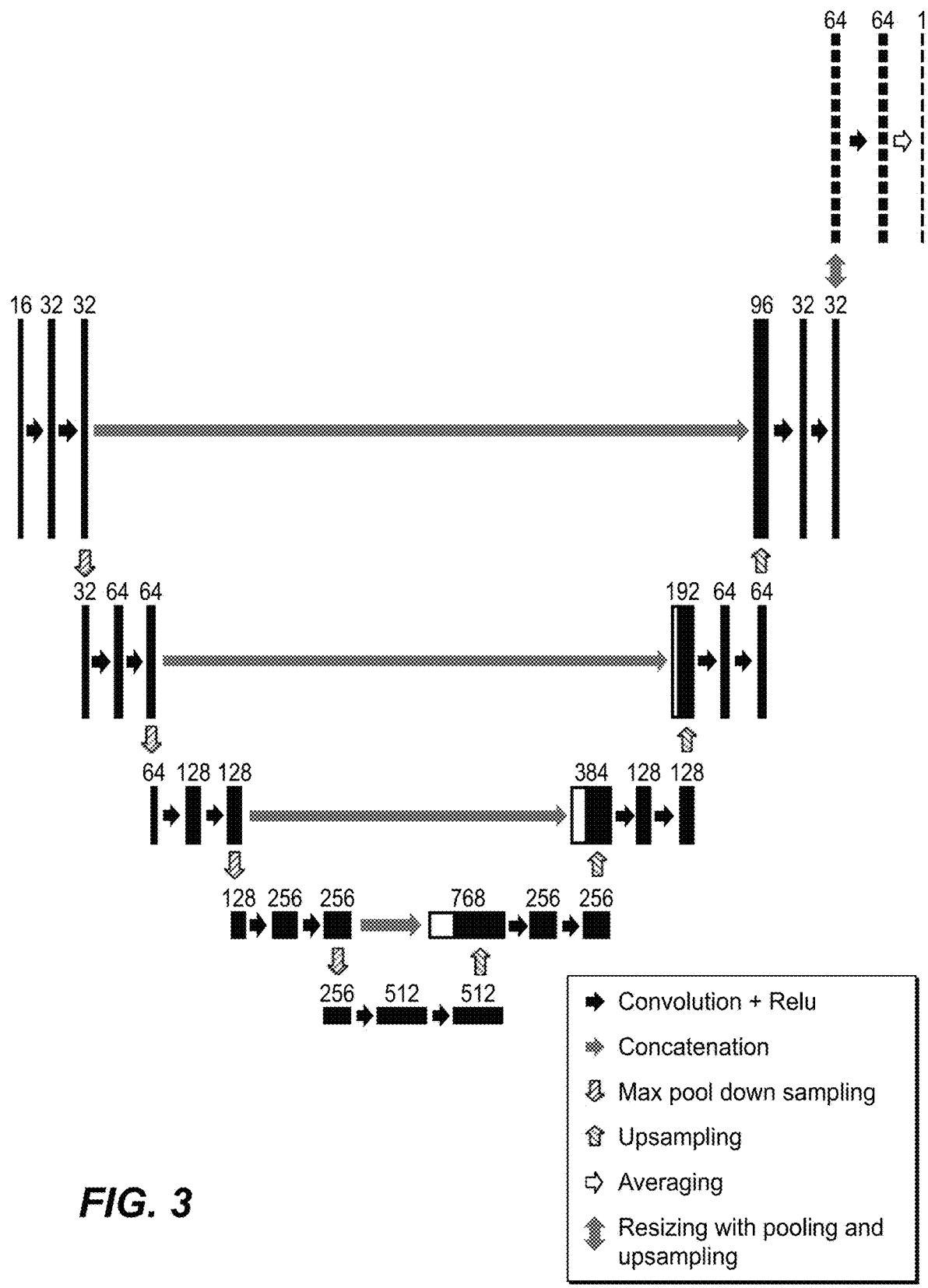
FIG. 3 illustrates a deep multiscale convolutional neural network architecture that can be used to map a relationship between seismic data and a wave speed model.

The architecture of the network can be critically important for the performance of the network. The CNN architecture used in this disclosure for solving geophysical inverse problems is inspired by the "U-net" architecture outlined in [17]. The U-net architecture, initially applied to biomedical imaging problems, offers a desirable feature of fusing information from multiple-scales to improve the accuracy in image segmentation. The U-net is designed to work with pairs of inputs and outputs that correspond to the same spatial domain (e.g., a microscopy image and its annotation mask) discretized into the same sizes, whereas in the present technological advancement the input and output domains belong to different spaces and are represented by different sizes of arrays. For instance, the input domain is discretized in the time and surface source/receiver coordinates as pointed out before. On the other hand, the output space is discretized in subsurface space. The U-net architecture is modified by including new layers and creating new operational units to transform the input domain to the output domain. This modification results in an asymmetric network architecture, giving it the shape of a "J" instead of a "U". An example of such an asymmetric CNN architecture is shown in FIG. 3. This new architecture will be referred as "J-net" from here on.

FIG. 3 illustrates a deep convolutional neural network architecture that can be used to map the relationship between seismic data and subsurface model at various scales. The middle layers of the networks map the larger scale features while the end layers map the fine scale features of the relationship from data to model. The numbers shown in FIG. 3 above each layer represent the number of channels in the layers. For instance, 16 shot gathers can be treated as a separate input data channel to the deep neural network, as is shown in the upper left corner of the "J" network schematic of FIG. 3, and the model (subsurface wave speed) as a single output channel is shown in the upper right corner of the "J" network schematic of FIG. 3. The network configuration of FIG. 3 can be referred to as "J-net", and is a modification of the "U-net" [17] to handle differences in sizes of the input and output in an application of the present technological advancement.

While FIG. 3 describes a particular architecture useable with the present technological advancement, the present technological advancement is also useable with other architectures such as residual neural network (ResNet) architecture [29]. A ResNet is a class of neural network architecture that modifies network connectivity to improve the flow of gradient information. This results in the ability to train much deeper networks (with hundreds of layers) and it has been demonstrated that ResNet improves model accuracy significantly.

Once a CNN model is architected, it is trained with examples of input and output pairs. The training process involves solving an optimization problem to determine the parameters of CNN units by minimizing the error between reference and predicted output values (also called labels). Typically, a stochastic gradient algorithm is used for optimization. Due to the large scale nature of the network (on the order of millions of parameters) and training data, specialized hardware (e.g. graphical-processing units (GPU) clusters) can be used to train networks in reasonable time frames (hours to days). Large-scale neural networks are prone to overfit training data. This occurs when a network is overly complex, such as too many network parameters relative to the amount of training data, leading to poor predictive performance even though it performs well with the training set. There are a number of standardized CNN procedures established to address this challenge such as drop-out regularization [18].

The content of the training set can play a role in the predictive performance of the network. Training samples are pairs of a subsurface physical model (e.g., compressional wave speed model) and its geophysical data (e.g., pressure measurements at the surface). The content of the training set is determined by the geological priors which can be a collection of information about the geological environment (e.g. geological basin), such as basin models, outcrops, geophysical data or well logs previously acquired within the same or analog geological environments. Such collection of information is expected to describe the geological features and structural patterns about the subsurface, such as expected lithological units, lithostratigraphic sequences or type of anomalies. The geological prior can be represented by multiple-point statistics of training images obtained from previously processed geophysical data such as seismic images, and available well logs. Another way of achieving a representation of the geological prior information is by training an artificial neural network such as autoencoder, a generative adversarial network [23] that learns the lithological units, lithostratigraphic sequences and subsurface structural patterns from the previously processed geophysical data and the existing well logs.

In some cases, prior data related to the geological environment can be inaccurate, insufficient or even absent. In such cases, synthetic priors based on geological expectations can be used or blended with the existing prior data. One way to test the validity of the geological priors is to compare geophysical images (e.g. seismic images) with the content of the geological priors. If the geological priors fail to represent all the geological structures and features in the images, the accuracy of CNN can be improved by including the missing geological structures and features in the training set. A workflow for such validity tests is displayed in FIG. 4 and demonstrated in the numerical examples.

For the examples discussed here, it is assumed that the geological prior information is available either in synthetic or empirical forms to sample a subsurface model from them. The geophysical data corresponding to a physical model can be readily available from the previous geophysical surveys (field data) or can be synthetically generated using mathematical models. For the present numerical examples, synthetic priors were used to generate the wave speed model, and acoustic wave equation (3) was used to generate the corresponding seismic data.

Even with today's available high-performance computing resources, one of the biggest challenges to geophysical inversions with the-state-of-the art methods is still the computational time required to solve a large-scale optimization problem formulated as a partial-differential-equation-constrained-optimization problem. It is infeasible to solve this large scale optimization problem during the data acquisition with conventional technology. The computational cost of the present technological advancement is in the training of the CNNs, which can be carried out only once and up front. Once the neural network is trained, predictions can be computed quickly (typically minutes to hours), which is a fraction of the time needed for solving geophysical inverse problems with the state-of-the-art methods (typically days to weeks). Such a speed-up to geophysical data processing enables the possibility of constructing subsurface models at data acquisition time, and also allows an interpreter to identify prospective regions during a survey (i.e., real-time) and possibly modify the survey online in order to improve imaging over the subsurface regions of interest. In some embodiments, the high performance computer (HPC) or single workstation unit, programmed according to the teachings of the present disclosure, could be disposed on a ship or other craft conducting an acquisition of geophysical data. For example, a single workstation unit could be sufficient to compute the predictions once the training of the network is done offline prior to acquisition time.

Processing of geophysical data using CNNs can potentially impact the geophysical data processing workflows at several stages of the current geophysical exploration and development. (1) It can be used during a geophysical survey by quickly process the freshly acquired data in order to test data quality and manage the survey. (2) It can directly be used for interpretation if the CNN is capable of resolving all the necessary geological units and features to identify the subsurface prospect and capture the reservoir framework. (3) The subsurface models produced from CNNs can serve as an input to the geophysical imaging step (e.g. the wave speed model used in seismic migration imaging). (4) The subsurface models produced by a CNN can also be used as an initial guess to the state-of-the-art geophysical inversion methods (e.g. full-wavefield inversion) to speed up and improve the robustness of the state-of-the art inversion methods. (2), (3) and (4) are demonstrated in the examples.

Figure 4:
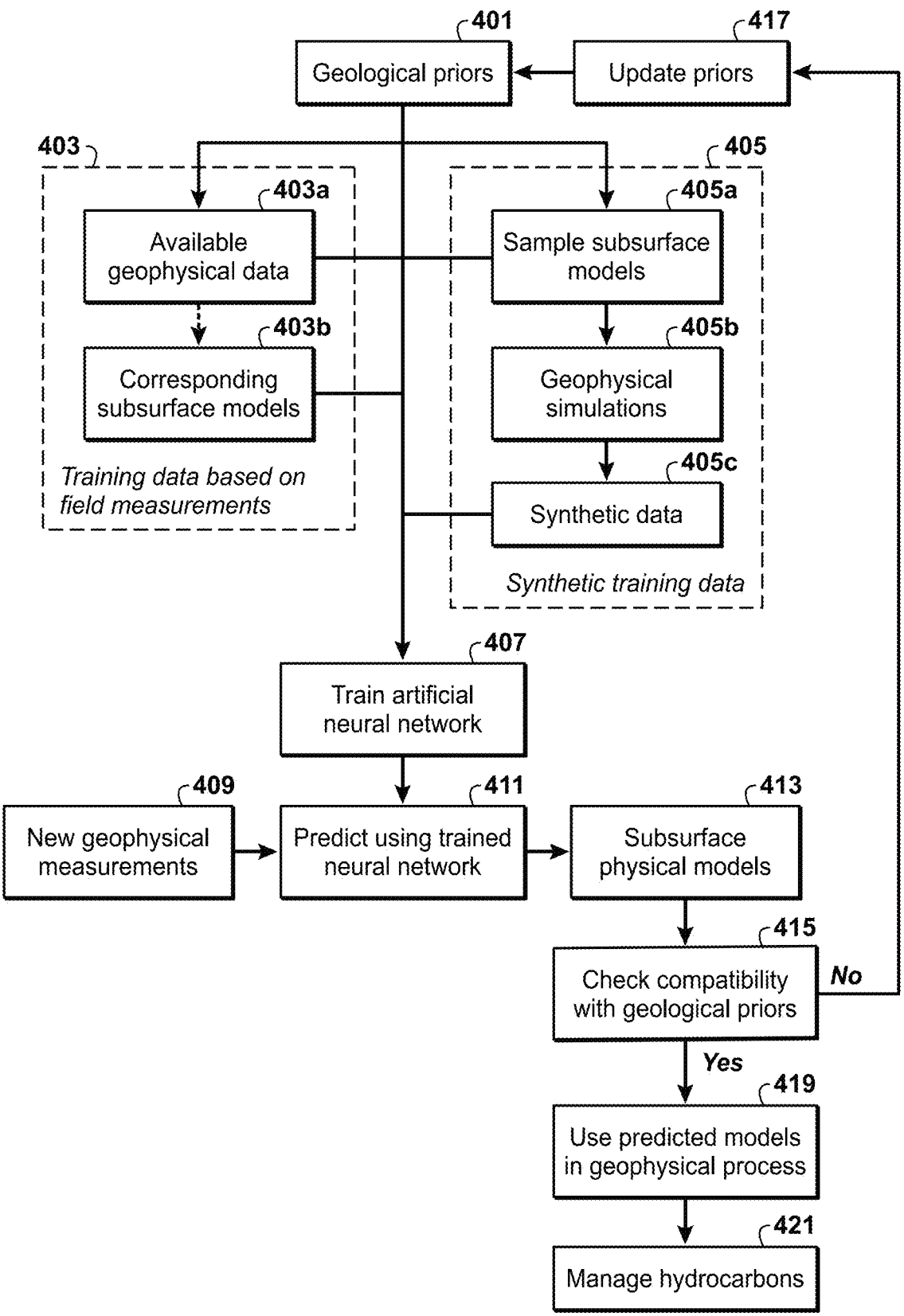
FIG. 4 illustrates an exemplary method embodying the present technological advancement.

FIG. 4 illustrates an exemplary method embodying the present technological advancement. Step 401 can include obtaining geological priors. Step 403 can include creating training data sets based on field measurements. Step 403 can include substep 403*a* of obtaining available geophysical data and substep 403*b* or obtaining corresponding subsurface model. The geophysical data can include one or more of seismic, time-lapse seismic, magnetic, electrical, electromagnetic, gravity, gradiometry, well log, well pressure and well production data. Step 405 includes obtaining synthetic training data. Step 405 can include substeps 405*a* of obtaining sample subsurface models, 405*b* of conducting geophysical simulation, and 405*c* of generating synthetic data. The synthetic data can be generated based on an acoustic wave equation, an elastic wave equation, coupled acoustic-elastic wave equations, Maxwell's equations, or potential-field equations, and the appropriate boundary conditions. Whether real and/or synthetic data is used to train the artificial neural network, the geophysical training data can represent prior geological knowledge about the subsurface region, and the geophysical training data can include environment of deposition, well information, stratigraphy, subsurface structural patterns and geophysical property ranges. With respect to steps 403 and 405, both are not necessarily performed as the training can be conducted with field data, synthetic data, or a combination of both. Step 407 includes training the artificial neural network, which is trained to relate the geophysical data to at least one subsurface physical property consistent with geological prior information. The available geological priors can be used to sample the subsurface models in order to train the network. The consistence with geological priors is used in forming the training set. Step 409 includes obtaining new geophysical measurements to be processed with the neural network. Step 411 includes predicting a subsurface physical property model using the trained neural network. The physical property can include one or more of acoustic, elastic, anisotropy, attenuation, electrical, magnetic, or flow properties. Step 413 includes outputting the predicted subsurface physical property model. Step 415 include checking the compatibility of the predicted subsurface physical property model with the geological priors. If necessary, the method can proceed to step 417 and update the geological priors. Otherwise, the process can proceed to step 419, which includes using the predicted subsurface physical property model in a geophysical process, such FWI or another inversion process, an imaging process (such as RTM), an interpretation process, or in the construction of a reservoir model. Such processes can, based at least in part on a subsurface image generated from the subsurface physical property model, be used to estimate a subsurface property that indicates hydrocarbon deposits in a subterranean geologic formation. Step 421 can use the generated information to manage hydrocarbons.

As used herein, hydrocarbon management includes hydrocarbon extraction, hydrocarbon production, hydrocarbon exploration, identifying potential hydrocarbon resources, identifying well locations, causing a well to be drilled, modeling, identifying reservoirs and hydrocarbon deposits, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

The following numerical examples demonstrate that the present technological advancement can construct subsurface geophysical models directly from pre-stack geophysical data with a reasonable accuracy. It is expected that the accuracy of the produced results with CNNs can be improved with more sophisticated CNN architectures and larger datasets. Two model examples are presented here. The first one assumes a geological prior that a structure of the subsurface wave speed model is layered. The second one expands the first example by assuming wave speed inclusions (e.g. salt anomalies) can be present in the layered subsurface background models.

Figure 7:
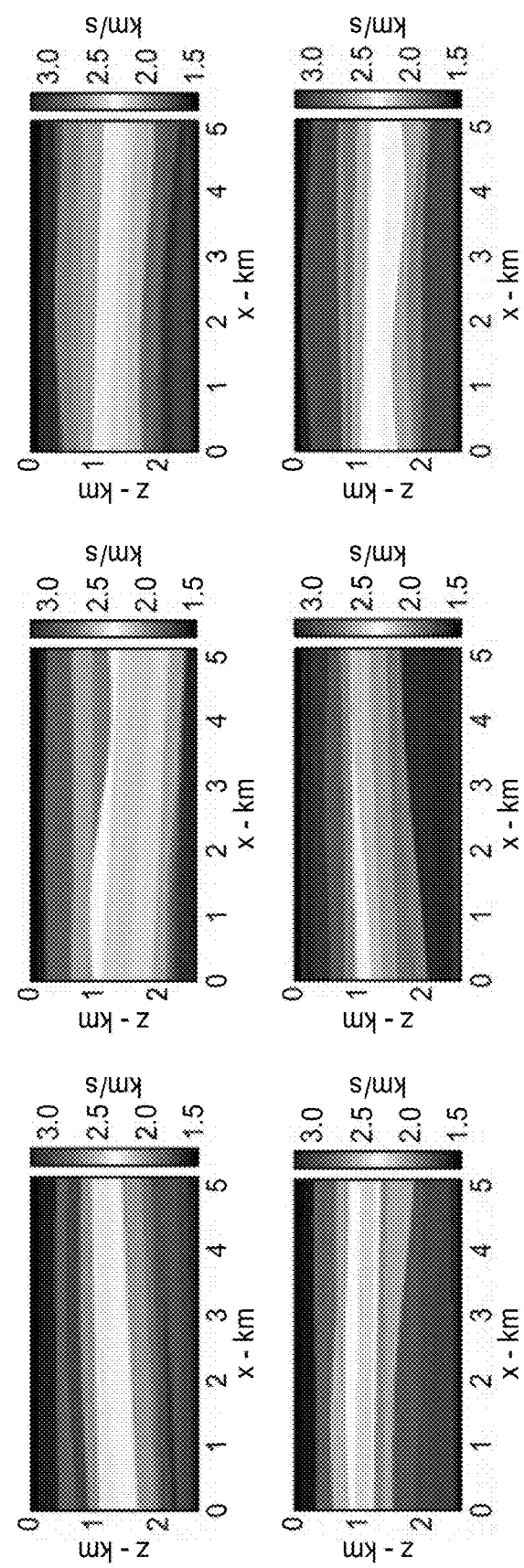
FIG. 7 illustrates samples of wave speed models.

In the first example, the geological prior assumes that the structures of subsurface models are layered. A set of parameters controls the variability in the sample models, such as the number of layers, range of velocities, sinusoidal roughness of the layer interfaces, layer dips and thickness variation in the horizontal direction. A random model generator draws values for these parameters to build a sample model. A number of the sample models are displayed in FIG. 7 in order to exemplify the variability in the training set. A total of 5,000 models were generated for training. Additionally, 100 models were constructed and reserved for testing the algorithm, which is called a holdout set.

Figure 1:
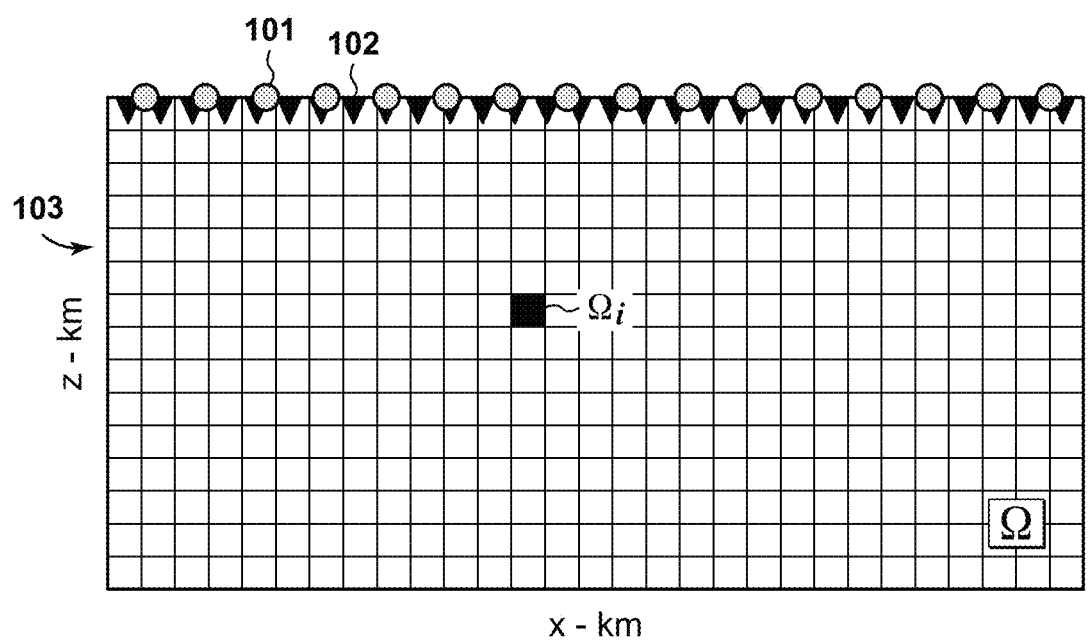
FIG. 1 illustrates an example of the discretization of a subsurface domain Ω and a geophysical survey configuration.
Figure 5:
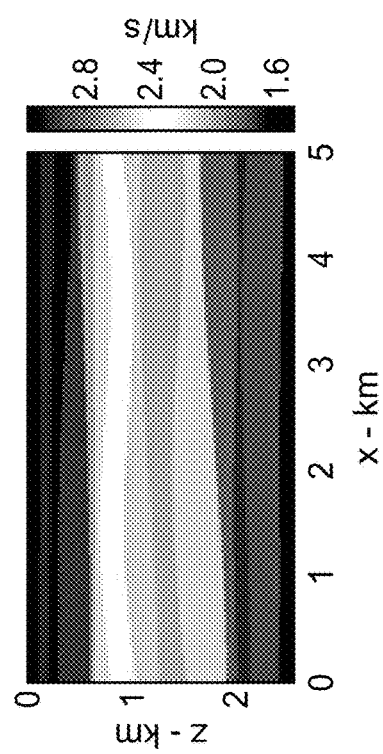
FIG. 5 illustrates an example of a compressional wave speed of a sampled layered subsurface model.
Figure 6:
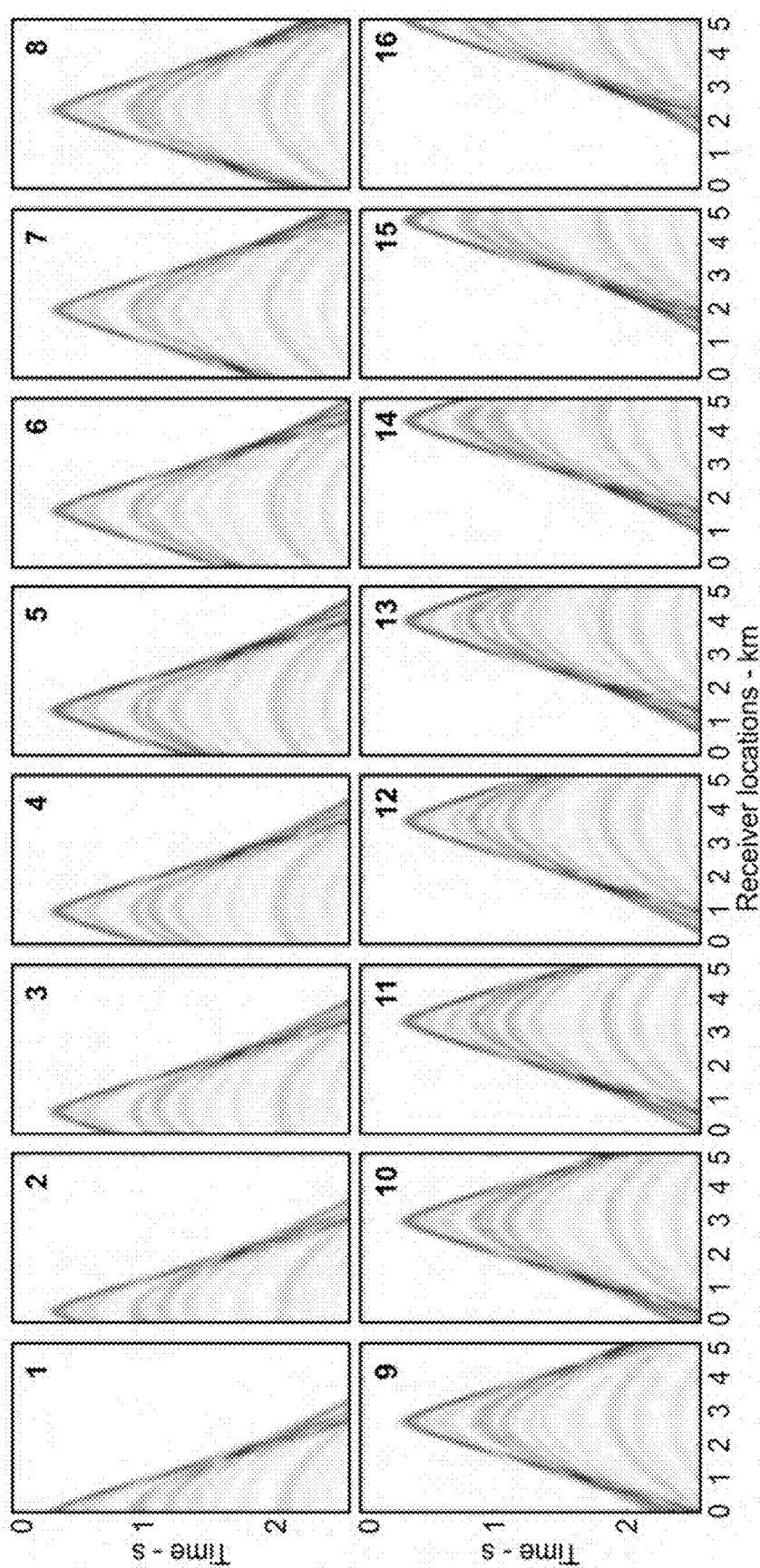
FIG. 6 illustrates shot gathers computed using equation (2) and the model of FIG. 5.

Next, the acoustic equations given in (2) were used to generate synthetic measurements of time-series signals with predefined acquisition geometry as displayed in FIG. 1, where sources and receivers are spread equidistantly in horizontal direction and 6 m below the surface. The data were generated for 256 receivers and 16 sources, and the direct arrivals from sources to receivers were removed from the data. The source temporal signatures for all the sources are a 10 Hz Ricker wavelet modified with 3 Hz low-cut filter. The data for 16 separate sources are shown in FIG. 6 for the sample wave speed model given in FIG. 5. Wavefields were simulated and data recorded for 5,000 training models and 100 testing models.

The deep CNN shown in FIG. 3 was trained with 5,000 pairs of models and seismic data. Training determines the parameters of filters at each layer by minimizing a mean-absolute error between training models and the network-computed models using a gradient-descent algorithm or a stochastic-gradient-descent optimization algorithm called Adam [19]. However, other optimization algorithms could be used such as Adagrad [26]. To speed up the training, evaluations of data samples and computations of gradients can be processed in parallel using multiple GPUs.

Figure 8:
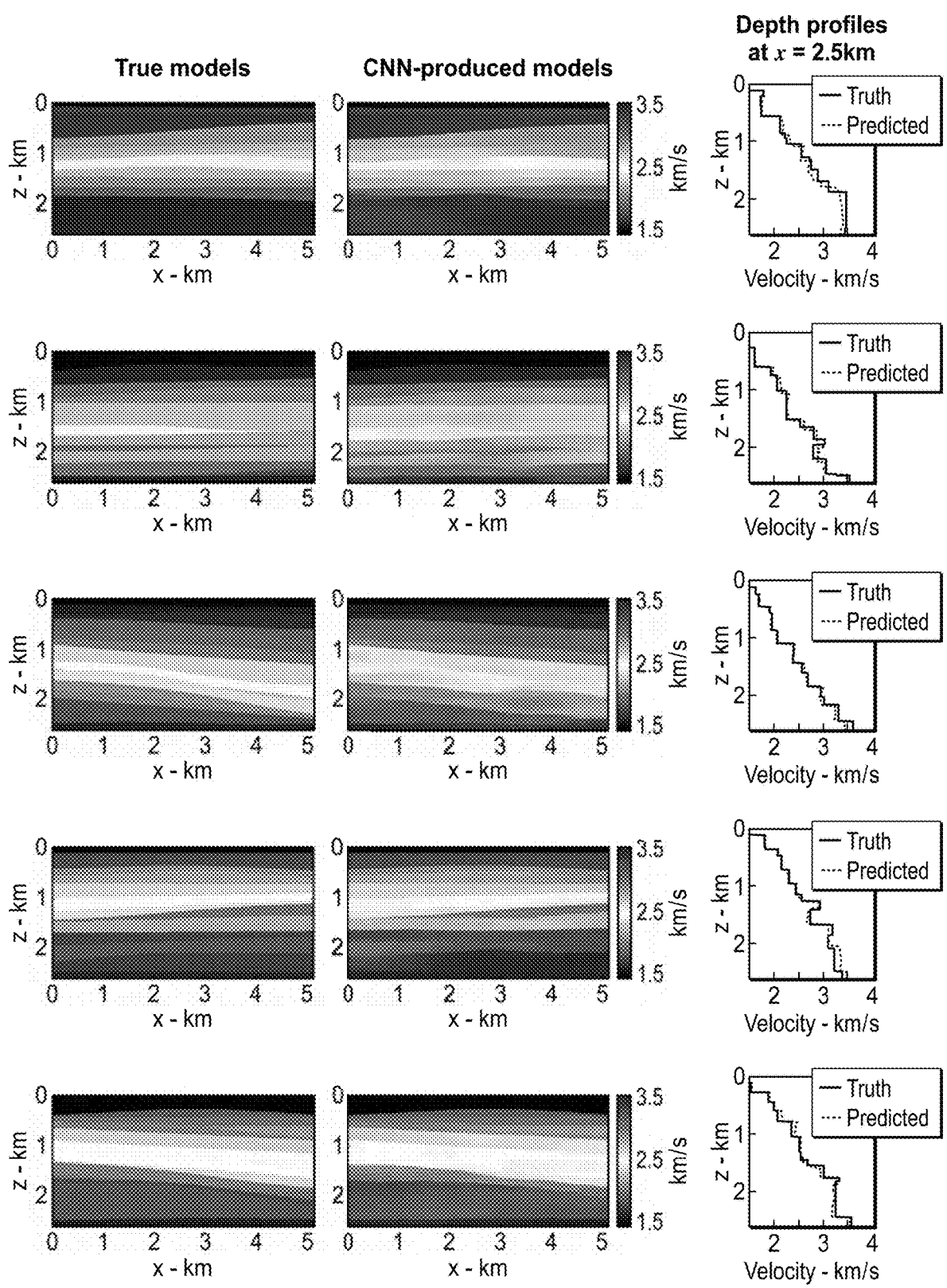
FIG. 8 illustrates test results from the trained neural network described in FIG. 3.

FIG. 8 displays five wave speed models from the holdout set (left column) and the corresponding models produced by the trained CNN (center column). The holdout set is not used during the training. The network captures reasonably well all the main spatial and amplitude trends in the wave speed models. The cross-sectional plots (right column) of the wave speed models show that the accuracy of the predictions decreases with depth. This is because that the strength of the seismic information acquired at the surface weakens with the depth as observed in FIG. 6. The accuracy of the predictions with CNNs can possibly be improved with more sophisticated architectures of CNN (e.g. additional layers) and with larger training datasets.

Figure 9:
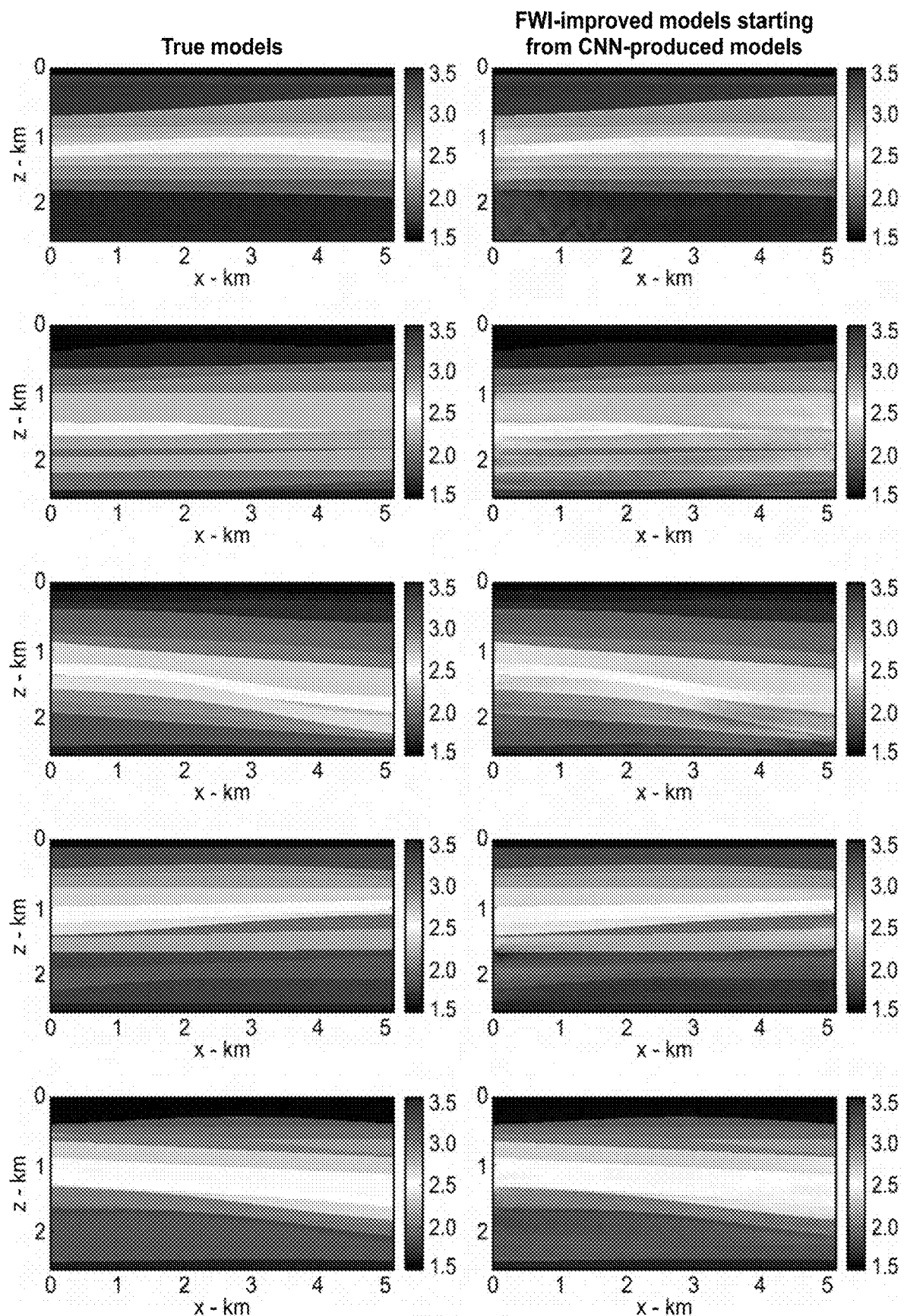
FIG. 9 illustrates a comparison of true wave speed models and wave speed models produced from a conventional FWI method starting with CNN-produced models.

One of the ways that CNN can be incorporated in current geophysical processing workflows is to use CNN-produced physical models as an initial guess to the state-of-the-art inversion methods (e.g., as a staring model for FWI). Building an initial subsurface physical property model for the state-of-the-art inversion methods is not a trivial process and a step that affects the robustness of the state-of-the-art inversion methods. FIG. 9 compares the five holdout models (left column) and the corresponding models inferred by FWI initialized by the CNN-produced wave speed models. The FWI method uses the starting models generated by the CNN, which are displayed in the center column of FIG. 8.

Figure 10:
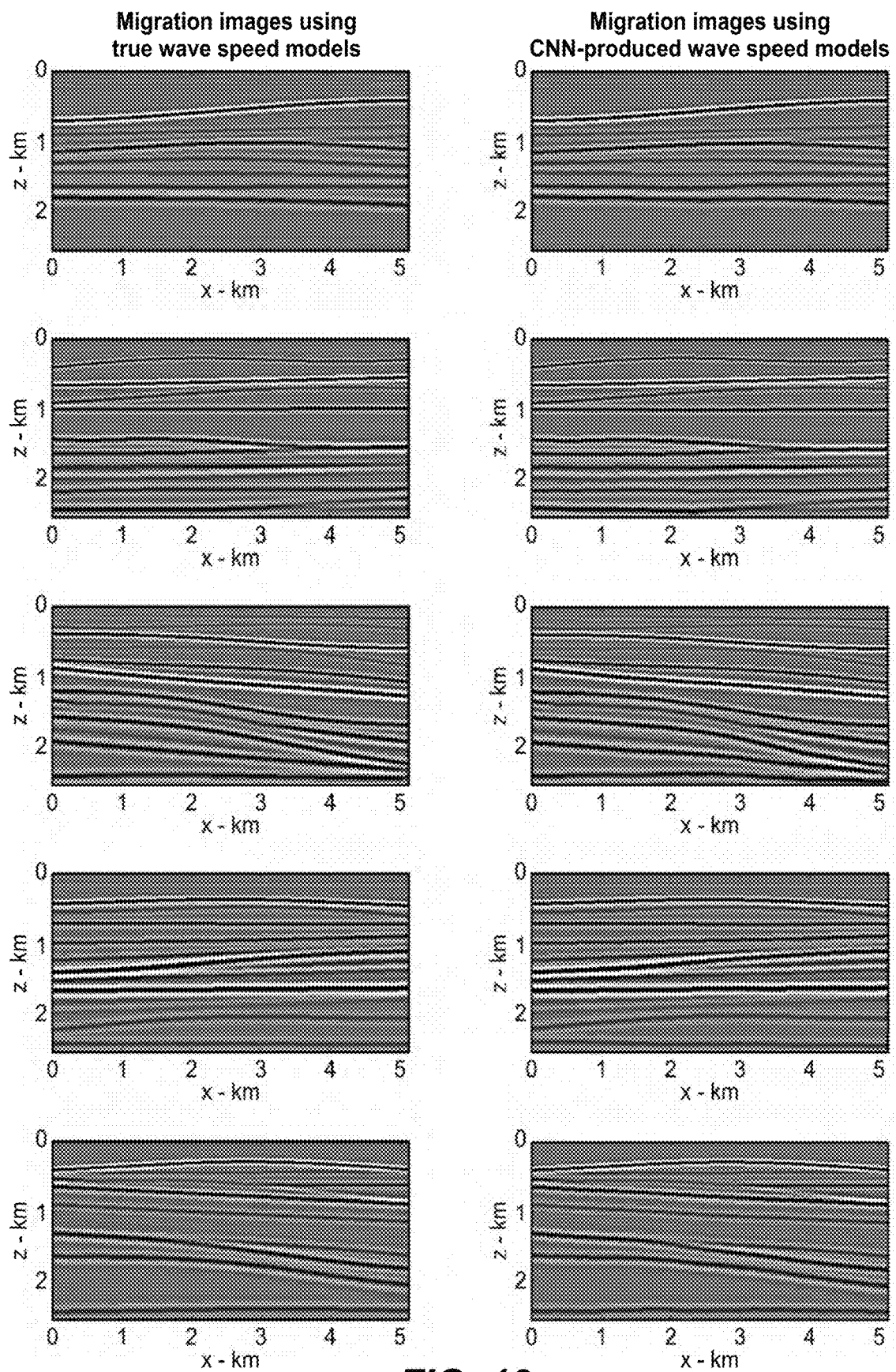
FIG. 10 illustrates a comparison of the migration images produced using the true wave speed models shown in FIG. 8 and the CNN-produced wave speed models shown in FIG. 8.

Another way of incorporating CNN in current geophysical processing workflows is to use CNN-produced physical models in the geophysical imaging phase, such as seismic imaging (e.g., RTM or reverse time migration). The fidelity of seismic imaging often relies on the accuracy of the wave speed models fed into the imaging process. FIG. 10 compares seismic images produced using the reference models (left column) and using the CNN-produced models (right column). These seismic images were obtained using a 1-D convolutional model, which relies on a 1-D wave speed models along the depth axis to produce 1-D primary reflection seismographs and images [20]. Better quality images can be produced using more advance seismic imaging methods [21] such as reverse-time migration [22]. FIG. 10 demonstrates that the locations of the reflectors are accurately placed in depth, which proves that wave speed models produced by the CNN provide sufficient kinematic accuracy to migrate primary reflection events in data from surface to their origins in depth.

Figure 11:
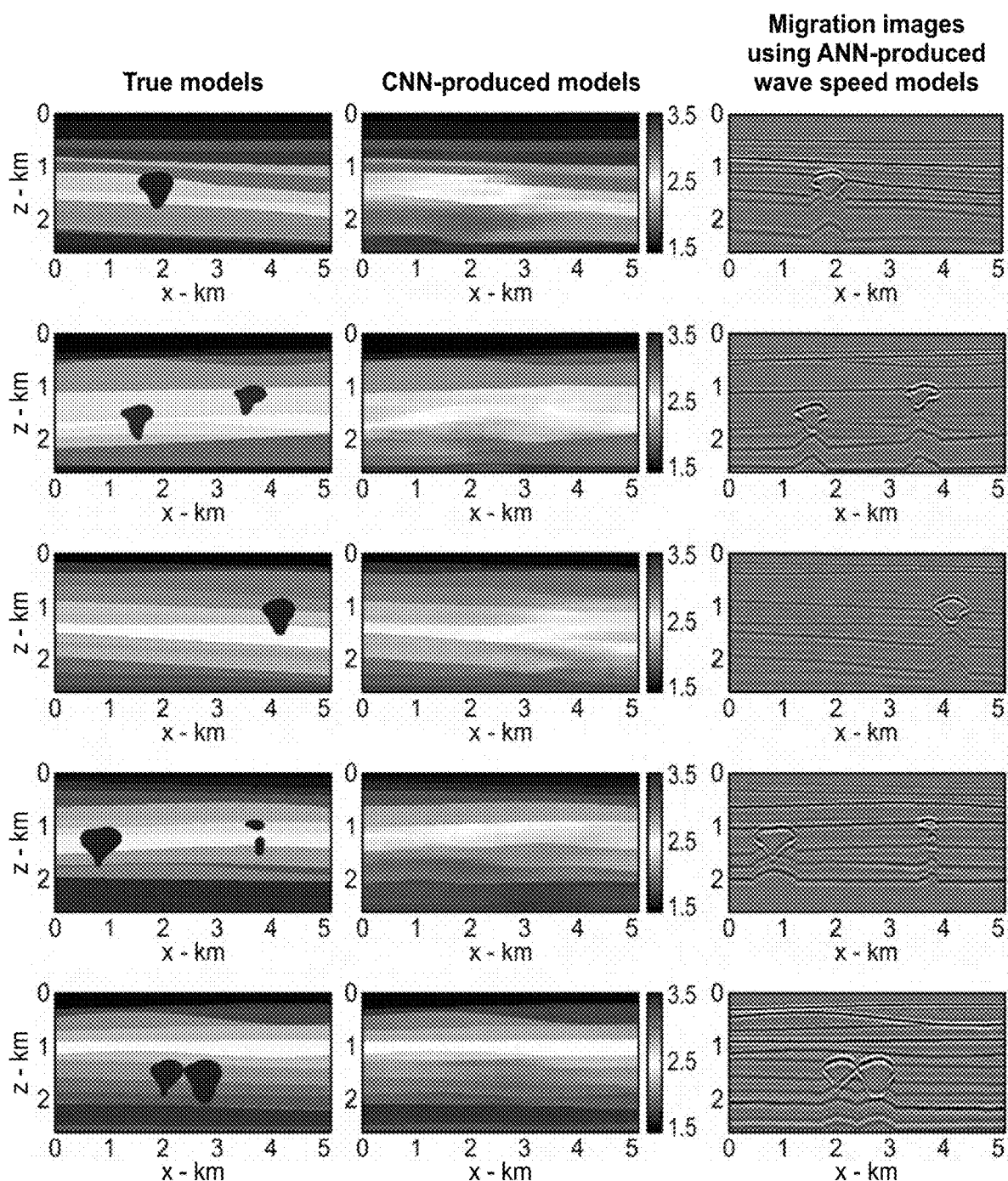
FIG. 11 illustrates a comparison of true wave speed models, the CNN-produced wave speed models, and migration images obtained using the CNN-produced wave speed models.

The content of the training set can play an important role in terms of what the network can infer from geophysical data. To demonstrate this, new synthetic seismic data was generated from models comprising layered background structures with one or more wave speed anomalies as shown in the first column of FIG. 11. These synthetic seismic data were processed using the previously discussed J-net, which was only trained with layered models. The J-net still produced layered models with missing anomaly structures as shown in the middle column of FIG. 11. Even though the anomaly structures are not present in the CNN-produced wave speed models, the seismic images obtained using these wave speed models provide indications about the presence of anomalies (right column). The data contains information about the existence of the anomalies because the velocity model. Because the velocity model is inaccurate, the migration images them in wrong locations and with incorrect shapes.

Figure 12:
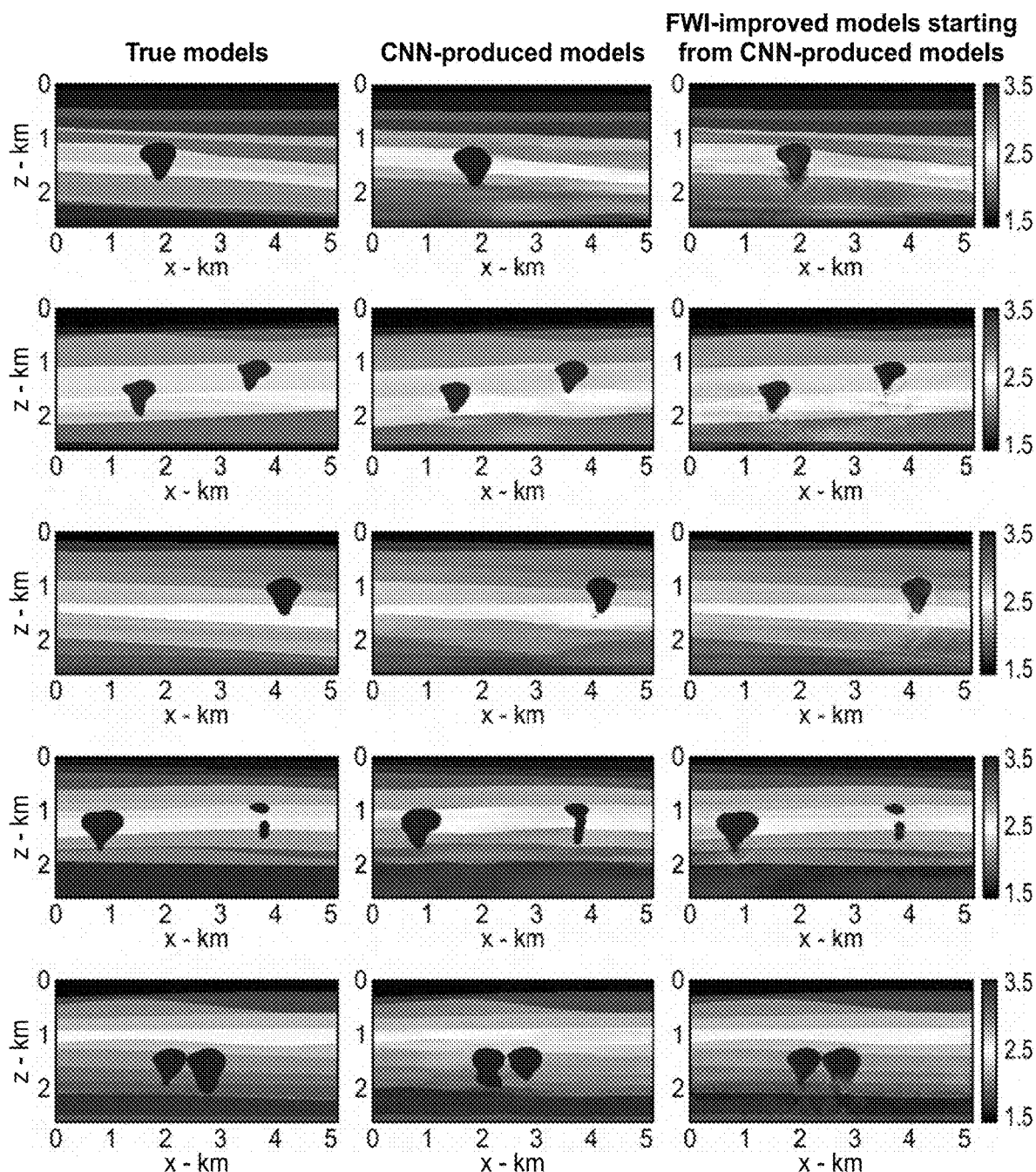
FIG. 12 illustrates a comparison of true wave speed models, the CNN-produced wave speed models, and FWI improved wave speed models produced by starting from the CNN-produced wave speed models.

For the remaining numerical examples, the training set was expanded to include samples with such anomaly structures, and the J-net architecture has been retrained. This newly trained network is able to build layered models with wave speed anomalies as shown in the second column of FIG. 12. FWI can further improve resolution of these anomalies without suffering from local minima, resulting in the wave speed models as shown in the right column of FIG. 12. The FWI method used the models obtained by the CNN-produced models in the middle column as the starting models.

Figure 13:
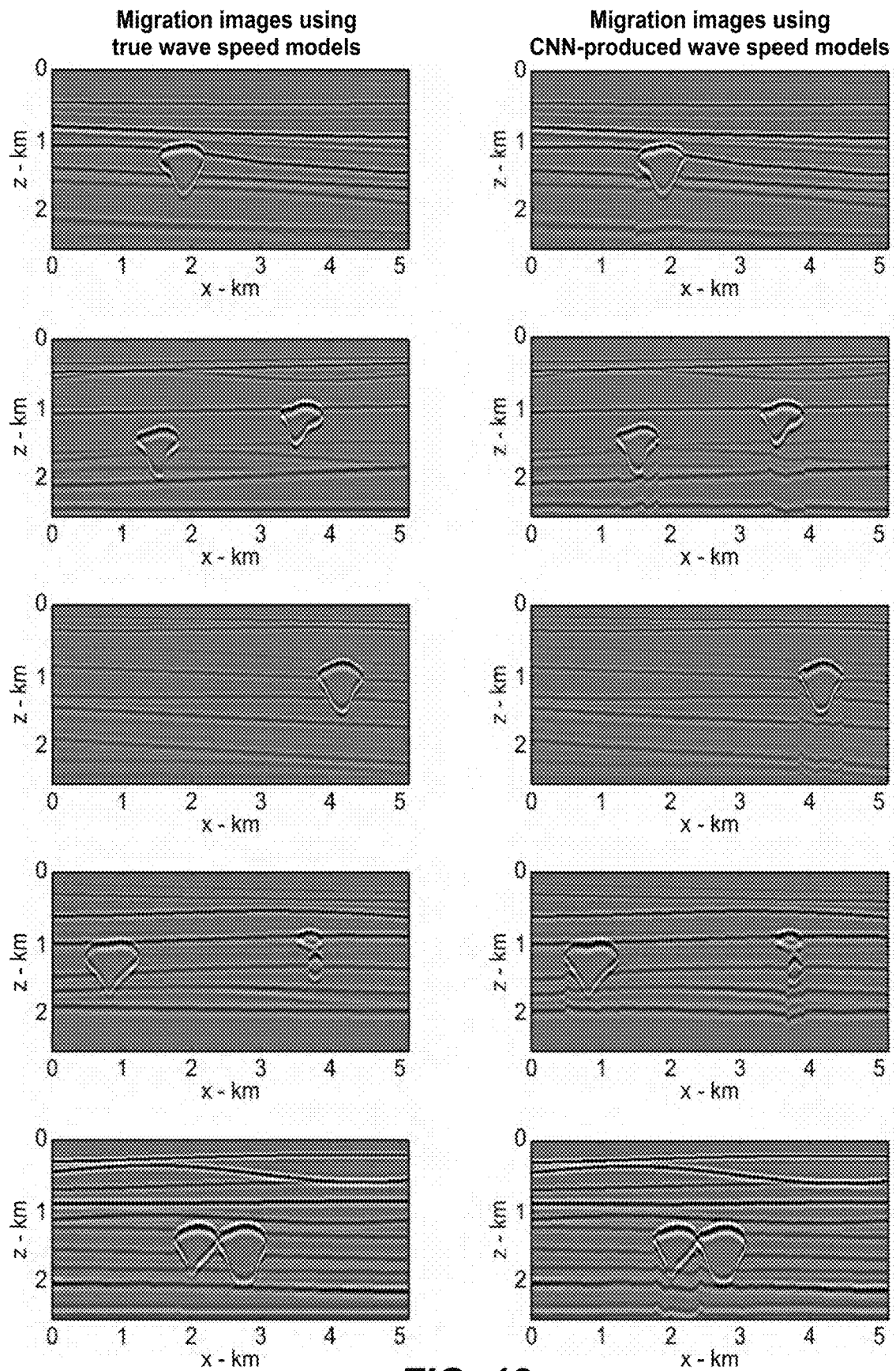
FIG. 13 illustrates a comparison of the migration images produced using the true wave speed models shown in FIG. 11 and the CNN-produced wave speed models shown in FIG. 12.

FIG. 13 shows seismic images generated using the reference models and models obtained by newly trained network. These seismic images (right column of FIG. 13) show that the shape of the anomalies and sub-anomaly section of the image are significantly improved compared to the previous images shown in right column of FIG. 11.

In all practical applications, the present technological advancement c be used in conjunction with a computer, programmed in accordance with the disclosures herein. Preferably, in order to efficiently perform the present technological advancement, the computer is a high performance computer (HPC), known as to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM.

The foregoing application is directed to particular embodiments of the present technological advancement for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in preferred embodiments of the invention, some or all of the steps in the present inventive method are performed using a computer, i.e. the invention is computer implemented. In such cases, the resulting gradient or updated physical properties model may be downloaded or saved to computer storage.

The following references are incorporated by reference in their entirety:

[1] Backus, G. E. and Gilbert, J. F., "Numerical applications of a formalism for geophysical inverse problems," Volume 13, *Geophysical Journal of the Royal Astronomical Society*, Pages, 247-276, 1967;
[2] Aster, R. C., Borchers, B., and Thurber, C. H., "Parameter Estimation and Inverse Problems," Pages 93-115, Elsevier, 2013;
[3] Akcelik, V., Denli, H., Kanevsky, A., Patel, K. K., White, L. and Lacasse M.-D., "Multiparameter material model and source signature full waveform inversion," *SEG Technical Program Expanded Abstracts*, Pages 2406-2410, 2012;
[4] Denli, H., Akcelik, V., Kanevsky A., Trenev D., White L. and Lacasse, M.-D., "Full-wavefield inversion for acoustic wave velocity and attenuation," *SEG Technical Program Expanded Abstracts*, Pages 980-985, 2013;
[5] Janoos, F., Denli H. and Subrahmanya N., "Multi-scale graphical models for spatio-temporal processes," *Advances in Neural Information Processing Systems*, 27, Pages 316-324, 2014;
[6] Chave A. D., and Jones, A. G., "The magnetotelluric method: theory and practice," Pages 1-7, Cambridge University Press, 2012;
[7] Tarantola, A., "Inverse problem theory and methods for model parameter estimation," Pages 57-64, SIAM, 2005;
[8] Virieux, J. and Operto, S. "An overview of full-waveform inversion in exploration geophysics," *Geophysics*, 74(6), Pages WCC1-WCC26, 2009;
[9] Oldenburg, D., "Inversion of electromagnetic data: An overview of new techniques," *Surveys in Geophysics*, 11(2), Pages 231-270, 1990;
[10] Li, Y. and Krahenbuhl, R., "Gravity and magnetic methods in mineral and oil & gas exploration and production," Pages 15-24, EAGE, 2015;
[11] Nocedal, J. and Wright, S. J. "Numerical optimization," *Springer Series in Operations Research and Financial Engineering*, Springer, Pages 21-26, 2006;
[12] Schiesser, W. E., "The numerical method of lines," Academic Press, 1991;
[13] Komatitsch, D. and Tromp, J. "The spectral element method for three-dimensional seismic wave propagation," *SEG Technical Program Expanded Abstracts*, Pages 2197-2200, 2000;
[14] Hesthaven, J. S. and Warburton, T., "Nodal Discontinuous Galerkin Methods: Algorithms, Analysis, and Applications," Pages 19-39, *Springer, Texts in Applied Mathematics*, 2008;
[15] Moczo, P., Robertsson, J. O. A. and Eisner, L., "The finite-difference time-domain method for modeling of seismic wave propagation," *Advances in Wave Propagation in Heterogeneous Earth, Advances in Geophysics*, Pages 421-516, Elsevier, 2007;
[16] Leveque, R. J., "Finite volume methods for hyperbolic problems," *Cambridge Texts in Applied Mathematics*, Cambridge University Press, Pages 64-85, 2002;
[17] Ronneberger, O., Fischer, P. and Brox, T., "U-Net: Convolutional Networks for Biomedical Image Segmentation," *Medical Image Computing and Computer Assisted Intervention (MICCAI), Springer, LNCS*, Volume 9351, Pages 234-241, 2015;
[18] Srivastava, N., Hinton, G., Krizhevsky, A., Sutskever, I. and Salakhutdinov, R., "Dropout: A simple way to prevent neural networks from overfitting," *Journal of Machine Learning Research*, 15, Pages 1929-1958, 2014;
[19] Kingma, P. D., and Ba, J., "Adam: A Method for Stochastic Optimization," *ICLR, arXiv*, 2015;
[20] Yilmaz, O., "Seismic data analysis: Processing, inversion, and interpretation of seismic data," *Investigations in Geophysics*, Society of Exploration Geophysicists, Pages, 463-476, 2001;
[21] Sava, P. and Hill, S. J., "Overview and classification of wavefield seismic imaging methods," *The Leading Edge*, v. 28(2), Pages 170-183, 2009;
[22] Etgen, J. T. and Michelena, R. J., "Introduction to this special section: Reverse time migration," *The Leading Edge*, v. 29(11), Pages 1363-1363, 2010;
[23] Goodfellow, I. J., Abadie, J. P., Mirza, M., Xu, B., Farley, D. W., Ozair, S., Courville, A., Bengio, Y., "Generative Adversarial Networks," *Machine Learning, arXiv*, 2014;
[24] Poulton, M. M., "Computational neural networks for geophysical data processing," *Handbook of Geophysical Exploration*, 2001;
[25] Baan, M. v. d, Jutten, C., "Neural networks in geophysical applications," *Geophysics*, 65(4), Pages 1032-1047, 2000;
[26] Macias, C. C., Sen, M. K. and Stoffa, P. L., "Artificial neural networks for parameter estimation in geophysics," *Geophysical Prospecting*, v. 48, Pages 21-47, 2000;
[27] Roth, G. and Tarantola, A., "Neural networks and inversion of seismic data," *Journal of Geophysical Research*, v. 99, Pages 6753-6768, 1994;
[28] Duchi, J., Hazan, E. and Singer, Y., "Adaptive subgradient methods for online learning and stochastic optimization," *Journal of Machine Learning Research*, v. 12, Pages 2121-2159, 2011; and
[29] He, K., Zhang, X., Ren, S. and Sun, J., "Deep residual learning for image recognition," 2016 *IEEE Conference on Computer Vision and Pattern Recognition*, 2016.

What is claimed is:

1. A method comprising:
   storing, in a computer memory, geophysical data obtained from a survey of a subsurface region;
   training one or more convolutional neural networks to relate the geophysical data to at least one subsurface physical property consistent with geological prior information; and
   extracting, with a computer, a subsurface physical property model by processing the geophysical data with the one or more convolutional neural networks, wherein one or more of the convolutional neural networks is built with a j-net architecture.

2. The method of claim 1, wherein the geophysical data includes one or more of seismic, time-lapse seismic, magnetic, electrical, electromagnetic, gravity, gradiometry, well log, well pressure, or well production data.

3. The method of claim 1, wherein the subsurface physical property includes one or more of acoustic, elastic, anisotropy, attenuation, electrical, magnetic, or flow properties.

4. The method of claim 1, wherein the method further includes training the convolutional neural network with synthetically generated subsurface physical models consistent with the geological prior information and computer simulated data generated from the synthetically generated subsurface physical models.

5. The method of claim 4, wherein the method further includes generating the computer simulated data based on an acoustic wave equation, an elastic wave equation, coupled acoustic-elastic wave equations, Maxwell's equations, or potential-field equations, and the appropriate boundary conditions.

6. The method of claim 1, wherein the method includes training the convolutional neural network with a training set of measured geophysical data and subsurface models associated with the training set of measured geophysical data.

7. The method of claim 1, wherein the method includes training the convolutional neural network with a blend of synthetic geophysical data and a training set of measured geophysical data and their associated subsurface models.

8. The methods of claim 1, wherein the method further includes training the convolutional neural network with geophysical training data that represents prior geological knowledge about the subsurface region, the geophysical training data including environment of deposition, well information, stratigraphy, subsurface structural patterns and geophysical property ranges.

9. The method of claim 1, wherein the convolutional neural network is a convolutional neural network including one or more operations of convolution, filtering, downsampling, upsampling, upconvolution, thresholding, or non-linear activation.

10. The method of claim 1, wherein the convolutional neural network is built with a ResNet architecture.

11. The method of claim 1, wherein the method further comprises training the convolutional neural network with a gradient descent algorithm or a stochastic gradient descent algorithm.

12. The method of claim 1, wherein the method further comprises monitoring a geophysical survey that is obtaining the geophysical data based on the subsurface physical property model.

13. The method of claim 1, wherein the method further comprises modifying a design of a geophysical survey that is obtaining the geophysical data during the geophysical survey based on the subsurface physical property model.

14. The method of claim 1, wherein the method further includes inputting the subsurface physical property model into subsurface interpretation, hydrocarbon exploration or hydrocarbon production process.

15. The method of claim 14, wherein the method further includes inputting the subsurface physical property model into a geophysical imaging process.

16. The method of claim 14, wherein the method further includes inputting the subsurface physical property model as a starting model of a geophysical inversion process.

17. The method of claim 14, wherein the method further includes identifying reservoirs and hydrocarbon deposits based on the subsurface physical property model.

18. The method of claim 14, wherein the method further includes constructing a reservoir model based on the subsurface physical property model.

19. A system, comprising:
a ship including sources and receivers that acquire geophysical data of a subsurface region; and
a non-transitory computer readable storage medium, encoded with instructions, which when executed by the computer causes the computer to:
store, in a memory of the computer, the geophysical data obtained from a survey of the subsurface region;
train, with the computer, one or more convolutional neural networks to relate the geophysical data to at least one subsurface physical property consistent with geological prior information; and
extract, with the computer, a subsurface physical property model by processing the geophysical data with the one or more convolutional neural networks, wherein one or more of the convolutional neural networks is built with a J-net architecture.

20. A non-transitory computer readable storage medium encoded with instructions, which when executed by the computer causes the computer to implement a method comprising:
storing, in a computer memory, geophysical data obtained from a survey of a subsurface region;
training, with a computer, one or more convolutional neural networks to relate the geophysical data to at least one subsurface physical property consistent with geological prior information; and
extracting, with a computer, a subsurface physical property model by processing the geophysical data with the one or more convolutional neural networks, wherein one or more of the convolutional neural networks is built with a J-net architecture.

* * * * *